United States Patent [19]
Sekigawa et al.

[11] 3,923,344
[45] Dec. 2, 1975

[54] SKID CONTROL ARRANGEMENT OF A AUTOMOTIVE BRAKING SYSTEM

[75] Inventors: Toshiharu Sekigawa, Atsugi; Yasuhisa Takeuchi, Yokosuka; Masanori Kouda, Atsugi; Tomoyoshi Sekiguchi, Yokohama, all of Japan

[73] Assignees: Nissan Motor Company Limited, Yokohama; Atsugi Motor Parts Company Limited, Atsugi, both of Japan

[22] Filed: June 11, 1974

[21] Appl. No.: 478,261

[30] Foreign Application Priority Data
June 13, 1973  Japan................................ 48-65772

[52] U.S. Cl......................... 303/21 AF; 188/181 A
[51] Int. Cl.²........................................... B60T 8/04
[58] Field of Search................... 188/181 A, 181 C; 303/21 AF, 21 F, 21 C, 21 CE, 21 CF, 21 CG

[56] References Cited
UNITED STATES PATENTS

| | | | |
|---|---|---|---|
| 3,682,513 | 8/1972 | Oberthur | 303/21 AF |
| 3,747,990 | 7/1973 | Tanguy | 303/21 AF |
| 3,827,763 | 8/1974 | Kobashi et al. | 303/21 F |

*Primary Examiner*—Duane A. Reger

[57] ABSTRACT

For the purpose of enabling a skid control arrangement of an automotive hydraulic braking system to be operable over an increased range of operating fluid pressure, the skid control arrangement is operable to control the skid of road wheels even when the operating fluid pressure is reduced below a cut-in pressure of an unloading valve incorporated into the source of the operating fluid pressure provided the operating fluid pressure and the braking fluid pressure are in a predetermined relation and if the operating fluid pressure is higher than a preload pressure of an accumulator unit of the operating fluid source.

14 Claims, 2 Drawing Figures

Fig. 2

SKID CONTROL ARRANGEMENT OF A AUTOMOTIVE BRAKING SYSTEM

The present invention relates to hydraulic brake systems of automotive vehicles and, more particularly, to a skid control arrangement for use in a hydraulic brake system of an automotive vehicle.

One important requirement of the skid control arrangement of the automotive brake system is apparently that the brake system is capable of immediately and reliably restoring the usual or non-skid-controlled braking mode in the event of a sudden drop of the operating fluid pressure as is oftentimes invited due to improper functioning of the brake system, especially, by a failure taking place in the fluid lines constituting the source of the operating fluid. For the purpose of meeting such a requirement, a prior art skid control arrangement uses a preload spring which is constantly acted upon by the operating fluid pressure so that the skid controlled braking is operable when the operating fluid pressure is maintained at a level overcoming the opposing force of the preload spring. In the event the operating fluid pressure is reduced beyond a permissible level, the force of the preload spring overcomes the operating fluid pressure and disables the skid control arrangement so that the braking on the road wheels is effected in a usual or non-skid-controlled mode. The braking fluid pressure usually prescribed on ordinary hydraulic braking systems amounts to about 150 kgs/cm² (approx. 2,133 lbs/sq. in) at its maximum and, to be competent with such a high braking pressure, the operating pressure applied to the skid control arrangement should be of the order of about 100 kgs/cm² (approx. 1,422 lbs/sq. in). This means that the preload spring incorporated into the prior art skid control arrangement should have a preload matching with such a high operating fluid pressure and, as a corollary of this the preload springs is extremely large-sized. Apparently this is objectionable in view of the limited allowance for space to accommodate the preload spring in the engine compartment of the vehicle.

A hydraulic skid control valve arrangement has therefore been developed with a view to providing a useful solution to this problem. The valve arrangement is, in effect, adapted to provide a main or ordinary braking fluid passage and a by-pass or emergency braking fluid passage between the master cylinder and the wheel cylinder so that the main braking fluid passage is made operative to perform the skid-controlled braking operation when the operating fluid pressure is higher than a predetermined permissible limit and the by-pass braking fluid passage is made operative to perform the braking operation in a non-skid-controlled fashion when the operating fluid pressure happens to be reduced below the permissible limit. The skid control valve arrangement of this nature features compact and relatively small-sized construction and is therefore ready for being installed in the engine compartment of the vehicle.

The operating fluid to work on the skid control valve arrangement is usually supplied from a source constituted by a constant-displacement pump usually driven by the engine of the vehicle, an accumulator unit having a predetermined preload pressure (such as a gas pressure in an accumulator unit of the gas-actuated type), and an unloading valve having a pilot line connected between the pump and the accumulator unit. In case the operating fluid pressure delivered from the fluid source happens to be lowered below the cut-in pressure of the unloading valve (which pressure is assumed to be the permissible lowest limit of the operating fluid pressure) due to for example, leakage of the fluid from the lines constituting the fluid source, the control valve arrangement is actuated to close the main braking fluid passage and to open the by-pass braking fluid passage.

The unusual decrease of the operating fluid pressure may be caused irrespective of the mode of operation of the automotive vehicle and will therefore be invited during usual cruising of the vehicle or when the vehicle is being decelerated through application of brakes on the road wheels. In the event the operating fluid pressure happens to be reduced beyond the cut-in pressure of the unloading valve during usual cruising or rapid deceleration of the vehicle, the skid control valve arrangement is shifted to an operative condition permitting the non-skid-controlled braking even though an impending skid condition may be being detected by a sensor associated with the valve arrangement. In view, however, of a danger that would be caused by the skidding of the road wheels, it is preferable that the skid-controlled braking be proceeded with until the operating fluid pressure is reduced to a level which is far lower than the cut-in pressure of the unloading valve.

It is, therefore, an important object of the present invention to provide an improved skid-control arrangement which is capable of permitting skid controlled braking operation in a broadened range of operating fluid pressure.

It is another important object of the invention to provide an improved skid control arrangement which is adapted to maintain the skid control functions even when the operating fluid pressure is reduced beyond the cut-in pressure of the unloading valve of the operating fluid source insofar as a predetermined relation is maintained between the operating fluid pressure and the braking pressure delivered from the master cylinder.

It is still another important object of the invention to provide an improved skid control arrangement which is adapted to be shifted from a skid-control mode to a non-skid-control mode when, and only when, the operating fluid pressure is reduced to or below a predetermined level which is far lower than the cut-in pressure of the unloading valve of the source of the operating fluid for the control arrangement.

It is still another important object of the invention to provide an improved skid-control arrangement which is sufficiently compact and small-sized and which is accordingly ready for being installed in a limited space available in an automotive vehicle.

It is further and another important object of the present invention to provide an improved skid control arrangement which is compatible with an extremely high braking pressure to be applied to the road wheels of an automotive vehicle.

In accordance with the present invention, these and other objects will be accomplished basically in a skid control arrangement for use in a hydraulic brake system having a master cylinder, to produce a braking fluid pressure, a wheel cylinder to receive the braking fluid pressure and a source of an operating fluid pressure having a first predetermined fixed level and a second predetermined fixed level lower than the first predetermined fixed level, which arrangement comprises main and by-pass braking fluid passage means which are disposed in parallel between the master cylinder and the wheel cylinder and which are acted upon by the braking and operating fluid pressure, the main braking fluid passage means being operative to open for providing a skid-controlled braking mode when the operating fluid pressure is at a level higher than the first predetermined fixed level or which is lower than the first predetermined fixed level and higher than a first variable level which is predetermined in relation to a given braking fluid pressure, and the by-pass braking fluid passage means being operative to open for providing a non-skid-controlled braking mode when the operating fluid pressure is at a level which is lower than a second variable level predetermined in relation to the given braking fluid pressure and higher than the first variable level or which is lower than the second predetermined fixed level.

More specifically, the skid control arrangement may comprise in combination with a hydraulic brake system having a master cylinder to produce a braking fluid pressure, a wheel cylinder to receive the braking fluid pressure and a source of an operating fluid pressure having a first predetermined fixed level and a second predetermined fixed level lower than the first predetermined fixed level, a housing formed with a first chamber in constant communication with the master cylinder, a second chamber to communicate with the first chamber through a first passage means, a third chamber to communicate with the source of the operating fluid, a fourth chamber in constant communication with the source of the operating fluid pressure, a fifth chamber in constant communication with the first chamber, a first bore in constant communication with the second chamber and a second bore which is in constant communication with the wheel cylinder and which is to communicate with the first bore through a second passage means or with the first chamber through a third passage means; a first valve means for opening or closing the first passage means; a first plunger movable in the second chamber and connected to the first valve means; a first piston movable in the third chamber, connected to the first plunger and large in pressure receiving area than the first plunger; the first plunger being acted upon by the braking fluid pressure when the first valve means is in a position to open the first passage means and the first piston being acted upon by the operating fluid pressure when the third chamber is in communication with the source of the operating fluid; the first plunger and the first piston being moved to cause the first valve means to open the first passage means when the operating fluid pressure acting on the first piston is at a level which is higher than the first predetermined fixed level or which is lower than the first predetermined fixed level and higher than a first variable level which is predetermined in relation to a given braking fluid pressure; a second plunger movable in the first bore; a second piston movable in the fourth chamber and connected to the second plunger; the second piston being constantly acted upon by the operating fluid pressure; a third plunger movable in the second bore; a third piston movable in the fifth chamber and connected to the third plunger; the third piston being constantly acted upon by the braking fluid pressure; and a second valve means connected to the second plunger and movable in the second bore between a first position to open the second passage means and close the third passage means and a second position to close the second passage and open the third passage means; the second and third plungers being movable between respective first positions to move the second valve means to the first position thereof and respective second position to move the valve means to the second position thereof; the second and third plungers being moved to the respective first positions thereof when the operating fluid pressure is at a level which is higher than a second variable level higher than the first variable level and predetermined in relation to the given braking fluid pressure and which is higher than the second predetermined fixed level and to the respective second positions thereof when the operating fluid pressure is at a level lower than the second variable level or than the second predetermined fixed level. The skid-control arrangement may further comprise an electric control module responsive to an impending skid condition of the road wheels for producing an output signal when held operative; a two-way flow-shift valve unit having an inlet port leading from the source of the operating fluid pressure, a first outlet port leading to the third chamber and a second outlet port open to the outside; a first switch responsive to the movement of the third plunger toward the second position thereof; and a second switch responsive to the second predetermined fixed level of the operating fluid pressure; the first and second switches being electrically connected in series to the control module for disabling the control module to produce the output signal when the first switch responds to the movement of the third plunger toward the second position thereof and/or the second switch responds to second predetermined fixed level of the operating fluid pressure. The source of the operating fluid pressure usually includes an unloading valve and an accumulator unit associated with a constant displacement pump and, thus, the first and second predetermined fixed levels above mentioned may be the cut-in pressure of the unloading valve and the preload pressure of the accumulator unit, respectively.

The features of the skid control arrangement of the hydraulic brake system will become more apparent from the following description taken in conjunction with the accompanying drawings, in which.

Figure 1:
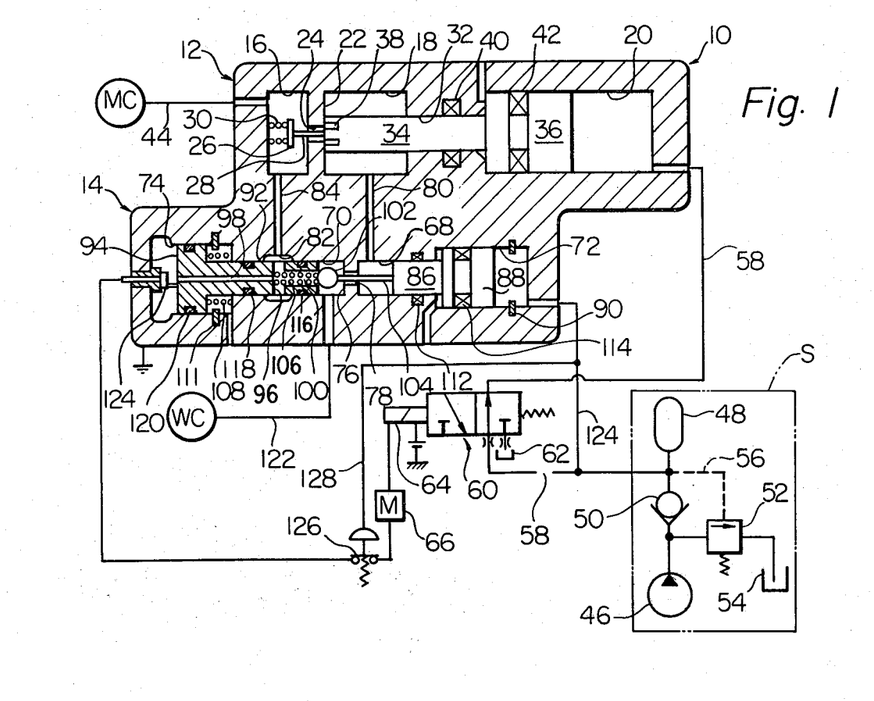
FIG. 1 is a longitudinal sectional view which shows a preferred embodiment of the skid control arrangement of an automotive hydraulic brake system according to the present invention.

Reference will now be made to the drawings, first to FIG. 1. The skid control arrangement of the hydraulic brake system according to the present invention comprises a housing 10 which is positioned between a master cylinder MC and wheel cylinders WC only one of which is illustrated. The housing 10 is largely built with a de-booster section 12 to provide a main or ordinary braking fluid passage between the master cylinder MC and the wheel cylinders WC so as to be predominant over the skid control operation of the brake system and an emergency or by-pass passage section 14 to provide a by-pass braking fluid passage between the master cylinder MC and the wheel cylinders WC for permitting the brake system to operate in a non-skid-controlled mode as in the event of an unusual drop of the operating pressure acting on the skid control arrangement.

In the de-booster section 12 of the housing 10 is formed first, second and third generally cylindrical chambers 16, 18 and 20, respectively, which are in line with each other in longitudinal directions thereof. The first and second chambers 16 and 18 are separated by a partition wall 22 which is formed with an aperture or passageway 24 providing communication between the two chambers 16 and 18. A valve 26 is positioned in the first chamber 16 and has a valve stem 28 extending throughout the passageway 24 and terminating in the second chamber 18. The valve 26 is urged to a position to close the passageway 24 by means of a preload spring 30 which is shown as being seated at one end on the valve 26 and at the other end on an end wall portion of the housing 10. The housing 10 is further formed with a bore 32 which extends in line with and between the second and third chambers 18 and 20. A de-booster plunger 34 is axially slidably received in this bore 32 and has one axial end portion projecting into the second chamber 18 and the other axial end portion projecting into the third chamber 20. The de-booster plunger 34 is connected to the stem 28 of the valve 26 at its axial end projecting into the second chamber 18 and to a piston 36 at its end projecting into the third chamber 20, the piston 36 being axially movable in the third chamber 20 as the plunger 34 is moved through the bore 32. The plunger 34 is formed with recesses or grooves 38 in its end portion projecting into the second chamber 18 for the purpose that the communication between the first and second chambers 16 and 18 can be maintained even when the plunger 34 is moved into abutting engagement with the partition wall 22. Designated by reference numeral 40 is a sealing element positioned between the plunger 34 and the housing 10 and by reference numeral 42 is a sealing element positioned between the piston 36 and the housing 10.

Figure 2:
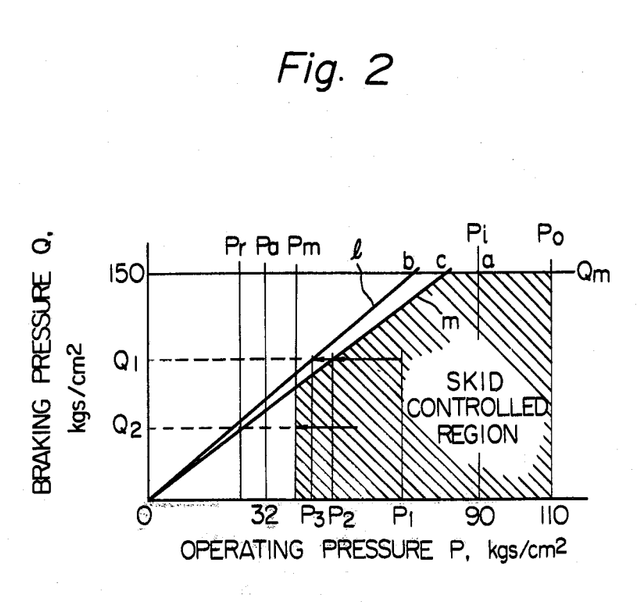
FIG. 2 is a diagram which indicates relations between the braking fluid pressure and the operating pressure in the skid control arrangement according to the present invention.

The first chamber 16 is in communication with the master cylinder MC through a braking fluid inlet passageway 44 so that a braking fluid pressure Q acts on the de-booster plunger 34 when the valve 26 is in a position to hold the passageway 24 open, whereas the third chamber 20 is in communication with a source S of an operating fluid so that an operating fluid pressure P acts on the piston 36 in the third chamber 20. The source S of the operating fluid comprises, as is customary in the art, a constant-delivery pump 46 which is usually driven by an engine (not shown) of the motor vehicle, an accumulator unit 48 having a fluid chamber communicating with the discharge end of the pump 46 through a one-way check valve 50, and an unloading valve 52 having an inlet port in communication with the discharge end of the pump 46 and an outlet portion in communication with a reservoir 54, the unloading valve 52 further communicating with the accumulator unit 48 through a pilot fluid line 56 as shown. From the source S of the operating fluid leads an operating fluid feed passageway 58 which is in communication with the third chamber 20 through a solenoid operated two-way flow-shift valve unit 60 having a port which is in communication with a reservoir 62. The flow-shift valve unit 60 has a solenoid device 64 which is electrically connected to an output terminal of a control module 66. The control module 66 is adapted to energize and de-energize the solenoid device 64 in accordance with schedules dictated by predetermined operational conditions of the brake system as will be described later. The accumulator unit 48 incorporated into the source S of the operating fluid may be of any of the types presently in common use provided the same has a predetermined preload pressure such as for example the pressure of gas filling the gas chamber of a gas-actuated accumulator unit. For the convenience sake, it is herein assumed that, where the master cylinder MC is adapted to produce a braking fluid pressure Q having a maximum valve $Qm$ of about 150 kgs/cm$^2$ (approx. 2,133 lbs/sq. in) as is usual in an ordinary motor vehicle, the accumulator unit 48 is arranged to provide a preload pressure $Pa$ of about 32 kgs/cm$^2$ (approx. 455 lbs/sq. in) and the unloading valve 52 arranged to have a cut-in pressure $Pc$ of about 90 kgs/cm$^2$ (approx. 1,280 lbs/sq. in) and a cut-out pressure $Po$ of about 110 kgs/cm$^2$ (approx. 1,564 lbs/sq. in). An analysis will thus be made on this assumption into the operation of the de-booster section 12 of the skid control arrangement with concurrent reference to FIGS. 1 and 2. In FIG. 2, the axis of ordinate represents the braking fluid pressure Q delivered from the master cylinder MC and the axis of abscissa indicated the operating pressure P delivered from the source S.

If, now, the ratio between the pressure acting areas (or the cross sectional areas) of the de-boost plunger 34 and the piston 36 are selected appropriately, a point $a$ may be taken in the diagram of FIG. 2, at which point the de-boost plunger 34 is held in a balanced position when the de-boost plunger is acted upon by the maximum braking fluid pressure $Pm$ of about 150 kgs/cm$^2$ and at the same time the piston 36 is acted upon by the cut-in pressure $Pc$ of 90 kgs/cm$^2$ which is dictated by the unloading valve 52. In order, however, that the de-boost plunger 34 be moved against the maximum braking fluid pressure $Qm$, it is necessary that such a ratio be selected in such a manner as to provide an allowance to enable the plunger 34 to remain in the balanced position even when the operating fluid pressure P is lower than the cut-in pressure $Pc$ of the unloading valve 52, as indicated by point $b$ in FIG. 2. (The ratio of the pressure acting area of the de-boost plunger to the pressure acting area of the piston thus determined is about 60:150.) When the ratio between the pressure acting areas of the plunger 34 and the piston 36 is determined in this manner, the operating fluid pressure P effective to move the de-boost plunger 34 against the braking fluid pressure Q varying from the maximum $Qm$ to zero will be given by a line $l$ joining the point $b$ and the origin O. Any operating fluid pressure P lower than a point of this line $l$ will thus be ineffective to move the de-boost plunger 34 against the braking fluid pressure Q even when the braking fluid pressure is reduced to a level corresponding to the particular point on the line $l$. When the operating fluid pressure P is dropped to or beyond such a critical level, the de-boost plunger 34 will be moved by the brake fluid pressure Q so as to cause the valve 26 to close the passageway 24. Under these conditions, the main braking fluid passage between the master cylinder MC and the wheel cylinders WC can no longer be maintained and accordingly brakes are applied on the road wheels in a non-skid-controlled mode.

In the usual schemes of operation of the skid control means of the brake system, the cut-in pressure $Pc$ dictated by the unloading valve 52 is dealt with as a lower limit of the operating fluid pressure P so that the main braking fluid passage predominent over the skid-control operation is shut off and instead the by-pass braking fluid passage to effect the non-skid-controlled braking is opened when the operating fluid pressure P is reduced beyond the cut-in pressure Pc of the unloading valve 52. As will be understood from observation of FIG. 2, however, the skid control operation could be continued if the braking fluid pressure Q is within a usually operative range even after the operating fluid pressure P has reduced beyond the cut-in pressure Pc of the unloading valve 52. In view of this hypothesis a point c is taken intermediate between the points a and c and a line m is drawn through this point c and the origin O. If, in this instance, the de-boost plunger 34 which has been moved by the braking fluid pressure Q to the position closing the passageway 24 is moved backwardly for re-opening the passageway 24 so that the operating fluid pressure P is reduced from a point $P_1$ (which is assumed to be lower than the cut-in pressure Pc of the unloading valve 52) to a point $P_2$ on the line m when the braking fluid pressure Q is at a level of $Q_1$, the residual operating pressure in the accumulator unit 48 still remains higher than a level $P_3$ given by the line l. Thus, one important aspect of the skid control arrangement of the hydraulic brake system according to the present invention is to achieve functions such that the de-boost plunger 34 once moved to the position interrupting the main braking fluid passage is positively or forcibly moved back to the position to re-open the main braking fluid passage when the operating fluid pressure P is reduced to a point on the line m and thereafter the main braking fluid passage is closed and in turn the by-pass braking fluid passage is opened for effecting the braking operation in a non-skid-controlled fashion. The fluid pressure P on the line m as will be determined when the braking fluid pressure Q assumes a certain value will be hereinafter referred to as a "critical" operating fluid pressure.

It is, on the other hand, well known that the braking fluid pressure Q drops sharply when the vehicle is running on a slippery or icy road. Under such a condition, the operating fluid pressure P may be reduced to a level lower than the preload pressure Pa of the accumulator unit 48 as indicated by a point Pr in FIG. 2. When the operating fluid pressure P is thus reduced to the level of Pr, either the braking operation in a skid-controlled mode is inaptly continued if the braking fluid pressure Q happens to be lower than a level given by the line m, or the de-boost plunger 34 of the de-booster section 12 could not resume the position to open the passageway 24 provided the braking fluid pressure Q happens to be higher than the level given by the line m. In accordance with another important aspect of the skid control arrangement of the hydraulic brake system according to the present invention, therefore, there is taken into consideration a minimum level Pm of the operating fluid pressure P which is appreciably higher than the preload pressure Pa of the accumulator unit 48. When thus the de-booster plunger 34 which has been moved by the brake fluid pressure Q to the position closing the passageway 24 is moved back by the operating fluid pressure P to the position to re-open the passageway 24, the residual operating fluid pressure P is still maintained at or above the level Pm which is higher than the preload pressure Pa of the accumulator 48. This minimum level Pm of the operating fluid pressure P will be referred to as an "absolute minimum" level. When the operating fluid pressure P is lowered to the absolute minimum level Pm, the main braking fluid passage is closed and instead the by-pass braking fluid passage is opened so that the braking operation is effected in a non-skid-controlled mode. The skid control arrangement of the hydraulic brake system herein proposed is, thus, adapted to effect the skid controlled braking when the operating fluid pressure P and the braking fluid pressure Q are in a relation falling within a hatched region in the diagram of FIG. 2.

In order to achieve the above described functions, the housing 10 has formed in its by-pass passage section 14 first and second bores 68 and 70 and fourth and fifth chambers 72 and 74 which adjoin the first and second bores 68 and 70, respectively. The bores 68 and 70 and the chambers 72 and 74 are disposed substantially in line with each other and in parallel to the first, second and third chambers 16, 18 and 20 formed in the de-booster section 12 of the housing 10. The first and second bores 68 and 70 are separated from each other by a partition wall 76 which is formed with an aperture 78 to provide communication between the first and second bores 68 and 70. The first bore 68 is in constant communication with the second chamber 18 in the de-booster section 12 through a passageway 80, whereas the second bore 70 has a circumferential groove portion 82 which is in constant communication with the first chamber 16 in the de-booster section 12 through a passageway 84. A control plunger 86 is axially slidably received in the first bore 68 and has an axial end portion projecting into the fourth chamber 72 adjoining the first bore 68. The control plunger 86 is connected at its end projecting into the fourth chamber 72 a control piston 88 which is axially movable in the fourth chamber 72. The movement of the piston 88 away from the bore 68 is limited by a stop member 90 which is secured to the housing 10. In the second bore 70 is axially movably received a counter plunger 92 which has an axial end portion projecting into the fifth chamber 74 adjoining the second bore 70. The counter plunger 92 carries at its end projecting into the fifth chamber 74 a counter piston 94 which is axially slidable in the fifth chamber 74. The counter plunger 92 is formed with a diametrical hole 96 which is in constant communication with the circumferential groove 82, an axial passageway 98 leading from the diametrical hole 96 and opening into the fifth chamber 74, and an axial bore 100 leading from the diametrical hole 96 and terminating at the axial end of the counter plunger 92 remote from the counter piston 94. A ball valve 102 is positioned between the apertured partition wall 76 and the axial end of the counter plunger 92 projecting toward the partition wall 76. The ball valve 102 is connected to the leading end of the control plunger 86 through a valve stem 104 which extends throughout the aperture 78 in the partition wall 76 leaving an annular space in the aperture 78. The ball valve 102 is thus moved to and seated on the partition wall 76 to close the aperture 78 in the partition wall 76 when the control plunger 86 and the counter plunger 92 are axially moved away from each other. When, conversely, the control plunger 86 and the counter plunger 92 are axially moved toward each other, the ball valve 102 is moved to and seated on the leading end of the counter plunger 92 so as to close the axial bore 100 in the counter plunger 92. A preload spring 106 is mounted in the axial bore 100 in the counter plunger 92 and is seated at its outer end on the ball valve 102, which is consequently biased away from the counter plunger 92. The counter plunger 92 is biased away from the ball-valve 102 by means of a preload spring 108 which is seated between the inner face of the counter piston 94 and the housing 10. The movement of the counter plunger 92 toward the partition wall 76 is limited by a stop member 110 which is secured to the housing 10. Designated by reference numerals 112, 114, 116, 118 and 120 are sealing elements by which the plungers 86 and 92 and the pistons 88 and 94 are hermetically sealed to the housing 10.

The space defined in the second bore 70 between the partition wall 76 and the leading end of the counter plunger 92 is in constant communication with the wheel cylinders WC through a passageway 122, whereas the fourth chamber 72 is in constant and direct communication with the source S of the operating fluid pressure through a passageway 124. The main braking fluid passage between the master cylinder MC and the wheel cylinders WC, viz., between the first chamber 16 leading from the master cylinder MC and the passageway 122 leading to the wheel cylinders WC is thus constituted by the passageway 24 in the partition wall 22, the second chamber 18, the passageway 80 leading from the second chamber 18, the space between the partition wall 76 and the leading end of the control plunger 86, the aperture 78 in the partition wall 76 (or more exactly the annular space between the valve stem 104 and the edge of the partition wall 76 defining the aperture 76), and the space between the partition wall 76 and the leading end of the counter plunger 92, when the valve 26 is in a position to open the passageway 24 in the partition wall 22 in the de-booster section 12 and concurrently the ball valve 102 is in a position opening the aperture 78 in the partition wall 76 and closing the axial bore 100 in the counter plunger 92 in the by-pass passage section 16. When, on the other hand, the ball valve 102 is unseated from the leading end of the counter plunger 92 and seated on the partition wall 76 so that the aperture 78 in the partition wall 76 is closed and the axial bore 100 in the counter plunger 92 is made open, the main braking fluid passage is interrupted and in turn the by-pass braking fluid passage is constituted between the master cylinder MC and the wheel cylinders WC, viz., between the first chamber 16 and the passageway 122 leading to the wheel cylinders WC through the passageway 84 leading from the first chamber 16, the circumferential groove 82 around the counter plunger 92, the diametrical hole 96 and the axial bore 100 in the counter plunger 92, and the space between the partition wall 76 (with the aperture 78 closed by the ball valve 102) and the leading end of the counter plunger 92. The relative movements of the control plunger 86 and the counter plunger 92 are brought about by a difference between the operating fluid pressure P directed into the fourth chamber 72 to act on the control piston 88 and the braking fluid pressure Q directed into the fifth chamber 74 through the axial passage 98 to act upon the counter piston 94. It is, thus, preferable that the control piston 88 and the counter piston 94 have substantially equal diameters or substantially equal pressure acting areas. To have cancelled the fluid pressures which will be imparted to the control plunger 86 and the counter plunger 92 by the fluid to flow through the first and second bores 68 and 70 when the passageway 78 in the partition wall 76 is open, the control plunger 86 and the counter plunger 92 may also preferably have equal diameters or pressure acting areas. As an alternative to the axial passageway 98 which is formed in the counter plunger 92, a passageway (not shown) may be formed in the housing 10 for providing constant communication between the fifth chamber 74 and the passageway 84 leading from the first chamber 16 or directly between the first and fifth chambers 16 and 74, where desired.

A limit switch 124 projects into the third chamber 74, having an actuating element (not shown) which is engageable with the counter piston 94 in the third chamber 74. The limit switch 124 is adapted to be closed when engaged by the counter piston 94 and to open when the counter piston 94 is axially moved away from the limit switch 124 or, in other words, when the control plunger 86 and the counter plunger 92 are moved rightwardly of the drawing into positions to cause the ball valve 102 to open the aperture 78 in the partition wall 76 so that the main braking fluid passage is established between the master cylinder MC and the wheel cylinders WC. It will thus be understood that the limit switch 124 is responsive to the previously defined "critical" operating fluid pressure which is determined by the line $m$ of FIG. 2 in terms of a given braking fluid pressure Q. To detect the previously defined "absolute minimum" level of the operating fluid pressure P, there is provided a pressure-responsive switch 126 which is responsive to the operating fluid pressure P through a fluid line 128 which is branched from the passage 124 interconnecting the source S of the operating fluid and the fourth chamber 72 in the housing 10. The pressure-responsive switch 126 is adapted to be closed in response to an operating fluid pressure P higher than the absolute minimum level $Pm$ and to open in response to an operating fluid pressure P lower then the absolute minimum level $Pm$. The limit switch 124 and the pressure-responsive switch 126 are electrically serially connected through a line 130 to an input terminal of the control module 66 which is thus made operative when both of the limit switch 124 and the pressure-responsive switch 126 are concurrently closed, viz., when the operating fluid pressure P is higher than the critical level dictated by the line $m$ of FIG. 2 and than the absolute minimum level $pm$.

The control module 66 has another input terminal which is connected to or has built therein sensors (not shown) to detect or otherwise calculate the vehicle speed and the circumferential speeds of rotation of the road wheels of the vehicle and is operative to deliver an output signal which is representative of an impending skid condition of the wheel or wheels during braking on the wheels. Such an impeding skid condition is usually determined by or calculated from a difference between the detected or calculated vehicle speed and the circumferential speeds of rotation of the road wheels which are usually calculated from the numbers of revolutions of the road wheels. The control module 66 has an output terminal connected to an input terminal of a coil (not shown) of the solenoid device 64 of the two-way flowshift valve unit 60. The flow-shift valve unit 60 is thus adapted to provide fluid communication between the fluid source S and the third chamber 20 in the housing 10 when the solenoid device 64 remains de-energized in the absence of an output signal from the control module 66 and to discharge the operating fluid into the fluid reservoir 62 when the solenoid device 64 is energized by the output signal delivered from the control module 66, viz., when an impending skid of the road wheels is detected by the control module 66 if both of the limit-switch 124 and the pressure-responsive switch 126 are held closed.

When, in operation, the operating fluid pressure P issuing from the fluid source S is in a proper range of higher than the cut-in pressure Pc of, for example, 90 kgs/cm² of the unloading valve 52 both of the limit-switch 124 and the pressure-responsive switch 126 are kept closed because, in respect of the former, the operating fluid pressure P acting on the control piston 88 overcomes the braking fluid pressure Q acting upon the counter piston 94 which is axially moved by means of the ball valve 102 leftwardly of the drawing and brought into pressing engagement with the actuating element of the limit-switch 124. If, under these conditions, no skidding is being encountered between the road wheels of the vehicle and the road surface, the control module 66 remains inoperative so that the solenoid device 64 for the two-way flow-shift valve 60 is kept de-energized. The two-way flow-shift valve 60 is consequently held in a position to establish the fluid communication between the source S of the operating fluid and the third chamber 20 in the de-booster section 12 of the housing 10. The de-boost plunger 34 is therefore axially moved forwardly or leftwardly of the drawing by the operating fluid pressure P acting on the piston 36 in the third chamber 20 and is stopped by the partition wall 22 between the first and second chambers 16 and 18. The valve 26 connected to the de-boost plunger 34 through the valve stem 28 is consequently unseated from the partition wall 22 and thus opens the passageway 24 in the partition wall 22, thereby providing uninterrupted communication between the first and second chambers 16 and 18 through the passageway 24 and the grooves or recesses 38 formed in the leading end portion of the de-boost plunger 34, as illustrated. The braking fluid delivered from the master cylinder MC is therefore directed to the individual wheel cylinders WC through the passageway 44, the first chamber 16, the passageway 24 in the partition wall 22, the grooves or recesses 38 in the de-boost plunger 34, the second chamber 18, the passageway 80 leading from the second chamber 18, the space in the bore 68 between the partition wall 76 and the leading end of the control plunger 86, the aperture 78 in the partition wall 76 (with the ball valve 102 kept unseated from the apertured partition wall 76), the space in the bore 70 between the partition wall 76 and the leading end of the counter plunger 92, and the passage 122 leading from the bore 70. If, under these conditions, skidding is about to take place between the road wheels and the road, the control module 66 detects the impending skid condition and produces an output signal. The solenoid device 64 is therefore energized to cause the two-way flow-shift valve unit 60 to drain the operating fluid into the fluid reservoir 62 and thus cut off the supply of the operating fluid to the third chamber 20 in the de-booster section 12. The fluid pressure P acting on the piston 36 in the third chamber 20 is consequently rapidly reduced so that the piston 36 and accordingly the de-boost plunger 34 are axially moved away from the partition wall 22 between the first and second chambers 16 and 18 until the valve 26 is seated on the partition wall 22, thereby closing the passageway 24 in the partition wall 22. The de-boost plunger 34 is thus partially withdrawn from the second chamber 18 with a consequent decrease in the fluid pressure obtaining in the second chamber 18, whereby the braking fluid pressure Q in the wheel cylinders WC is lessened and accordingly the road wheels are relieved of the braking forces which have been applied thereto. Under these conditions, the ball valve 102 is held in a position opening the aperture 78 in the partition wall 76 because of the fact that the same is restrained to the control plunger 86 by means of the valve stem 104.

When the road wheels are released from the braking pressures in this manner, the impending skid condition is eliminated so that the control module 66 is re-set or cleared. The solenoid device 64 is therefore de-energized to cause the flow-shift valve unit 60 to establish the fluid communication between the source S of the operating fluid and the third chamber 20. The piston 36 is for a second time acted upon by the operating fluid pressure P thus directed into the third chamber 20 from the source S and causes the de-boost plunger 34 to axially move toward the partition wall 22 so that the passageway 24 in the partition wall 22 is re-opened by the valve 26. Fluid communication is therefore established for a second time between the master cylinder MC and the wheel cylinders WC through the previously named route whereby the road wheels are subjected to the braking fluid pressure Q. The operating fluid pressure P is applied to the piston 36 and accordingly the braking fluid pressure Q is directed to the wheel cylinders WC repeatedly each time the control module 66 detects the impending skid condition during braking so that the skidding of the road wheels on the surface of the road can be prevented from occurring.

As previously noted with reference to FIG. 2, the skid-controlled braking operation is effected even when the operating fluid pressure P may be reduced below the cut-in pressure Pc of the unloading valve 52 of the source S of the operating fluid insofar as the relation indicated by the hatched area of the diagram of FIG. 2 is maintained between the operating fluid pressure P and the braking fluid pressure Q. If, in this instance, the brake pedal is depressed to develop a braking fluid pressure $Q_1$, the skid-controlled braking operation can be effected for a duration starting at point $P_1$ lower than the cut-in pressure Pc of the unloading valve 52 to point $P_2$ given by the line $m$. When the operating fluid pressure P is being reduced from point $P_1$ to $P_2$, the counter piston 88 is acted upon by an operating fluid pressure P overcoming the braking fluid pressure Q acting upon the counter piston 94 so that the main braking fluid passage between the master cylinder MC and the wheel cylinders WC is maintained when the valve 26 is moved to a position opening the passage 24 in the partition wall 22. When the operating fluid pressure P is dropped to the critical level indicated by point $P_2$ on the line $m$, the control plunger 86 and the counter plunger 92 will be held in equilibrium positions so that the main braking fluid passage between the master cylinder MC and the wheel cylinders WC is still maintained when the passageway 24 in the partition wall 22 is open. If, however, the operating fluid pressure P happens to be lowered beyond the level indicating by the point $P_2$, then the equilibrium between the plungers 86 and 92 is lost so that the plungers 96 and 92 will be axially moved rightwardly of the drawing, causing the actuating element of the limit switch 124 to be disengaged from the counter piston 94. The limit switch 124 is consequently made open and disable the control module 66 to energize the solenoid device 64 for the two-way flow-shift valve unit 60. The flow-shift valve unit 60 is therefore actuated into a position providing fluid communication between the source S of the operating fluid and the third chamber 20 in the de-booster section 12. The fluid pressure P remaining in the accumulator unit 48 of the source S is thus subjected to the piston 20 so that, even though the de-boost plunger 34 may have been moved to the retracted position, the de-boost plunger 34 can be moved back to the position providing the main braking fluid passage. The residual fluid pressure available under these conditions is higher than the level indicated by point $P_2$ and accordingly than the level indicated by point $P_3$ given by the previously mentioned line $l$ in the diagram of FIG. 2 and is, for this reason, effective to move the de-boost plunger 34 from the retracted position to the foremost position in which the passageway 24 in the partition wall 22 is opened by the valve 26. The control plunger 86 and the counter plunger 92 are, as a consequence, moved back to their initial axial positions so that the limit switch 124 closes for a second time, enabling the control module 66 to dictate the skid-controlled braking operation.

When, on the other hand, the vehicle is running on an icy or otherwise slippery road surface, the braking fluid pressure Q delivered from the master cylinder MC is reduced to, for example, a level indicated by $Q_2$ in the diagram of FIG. 2, the main braking fluid passage between the master cylinder MC and the wheel cylinders WC will be maintained so that the skid-controlled braking operation is proceeded with until the operating fluid pressure P is lowered to the absolute minimum level P$m$. When, however, the operating fluid pressure P reaches the absolute minimum level P$m$, the pressure-responsive switch 126 is made open so that the control module 66 is rendered inoperative. Under these conditions, the operating fluid pressure P acting upon the control piston 88 is overcome by the braking fluid pressure Q applied to the counter piston 94 with the result that the control plunger 86 and the counter plunger 92 are axially moved rightwardly of the drawing. The axial movement of the counter plunger 92 is stopped when the counter piston 94 connected thereto abuts against the stop member 111 whereafter the axial movement of the control plunger 86 is stopped when the control piston 88 strikes the stop member 90. The ball valve 102 connected to the control plunger 86 is accordingly unseated from the leading end of the counter plunger 92 and is, in turn, seated on the apertured partition wall 76 between the first and second bores 68 and 70, thereby closing the aperture 78 in the partition wall 76 and opening the axial bore 100 in the counter plunger 92. The main braking fluid passage through the aperture 78 in the partition wall 76 is consequently blocked by the ball valve 102 irrespective of the axial position of the de-boost plunger 34 and instead the by-pass braking fluid passage between the master cylinder MC and the wheel cylinders WC is established through the passageway 44 leading from the master cylinder MC, the first chamber 16 in the housing 10, the passageway 84 leading from the first chamber 16, the circumferential groove 82 around the counter plunger 92, the diametrical hole 96 and the axial bore 100 in the counter plunger 92, the space in the second bore 70 between the partition wall 76 and the leading end of the counter plunger 92, and the passageway 122 leading to the wheel cylinders WC. The braking on the road wheels of the vehicle is, in this manner, effected in a non-skid-controlled fashion. Since, in this instance, the operating fluid pressure P delivered from the source S is maintained at the absolute minimum level P$m$ which is higher than the pre-load pressure P$a$ of the accumulator unit 48 of the source S, the de-boost plunger 34 can be moved to the foremost position to open the passageway 24 in the partition wall 22 of the de-booster section 12 when the operating fluid pressure P rises for a second time above the absolute minimum level P$m$, as previously discussed. The stop member 90 is located in such a manner as to enable the ball valve 102 to close the aperture 78 in the partition wall 76 when the control plunger 86 is moved from the initial position and the control piston 88 is brought into abutting engagement with the stop member 90. On the other hand, the stop member 111 is so located as to enable the counter plunger 92 to be disengaged from the ball valve 102 when the counter plunger 92 is moved from the initial position and the counter piston 94 is brought into abutting engagement with the stop member 111.

From the foregoing description it will now be appreciated that the skid-controlled braking can be effected reliably even when the fluid pressure to operate the braking system is reduced below the cut-in pressure of the unloading valve of the operating fluid source or the lowest level of the accumulator unit provided in the operating fluid source as long as the relation between the operating fluid pressure and the braking fluid pressure falls within a predetermined region.

What is claimed is:

1. A skid control arrangement for use in an automotive vehicle including a master cylinder to produce a braking fluid pressure, a wheel cylinder to receive the braking fluid pressure, a source of an operating fluid pressure having a first predetermined fixed level and a second predetermined fixed level lower than the first predetermined fixed level, which control arrangement comprises main braking fluid passage means connecting the master cylinder and the wheel cylinder and acted upon by the braking fluid pressure and the operating fluid pressure in relation to one another, the main braking fluid passage means being operative to open for feeding the braking fluid pressure produced at the master cylinder to the wheel cylinder, while being operative to reduce the braking fluid pressure to be supplied to the cylinder for providing a skid control when the operating fluid pressure is at a level which is higher than said first predetermined fixed level or which is lower than the first predetermined fixed level and higher than a variable level which is predetermined in relation to a given braking fluid pressure, and by-pass braking fluid passage means connecting the master cylinder and wheel cylinder in parallel with the main braking fluid passage means and acted upon by the braking fluid pressure and operating fluid pressure in relation to one another, the by-pass passage means being operative to open for feeding the braking fluid pressure produced at the master cylinder to the wheel cylinder for cancelling the skid control when the operating fluid pressure is at a level which is lower than a second variable level predetermined in relation to the given braking fluid pressure and higher than the first variable level or which is lower than said second predetermined fixed level.

2. A skid control arrangement for use in an automotive hydraulic brake system including a master cylinder to produce a braking fluid pressure, a wheel cylinder to receive the braking fluid pressure and a source of an operating fluid pressure having a first predetermined fixed level and a second predetermined fixed level lower than the first predetermined fixed level, which control arrangement comprises a housing formed with a first chamber in constant communication with the master cylinder, a second chamber to communicate with the first chamber through a first passage means, a third chamber to communicate with the source of the operating fluid pressure, a fourth chamber in constant communication with the source of the operating fluid pressure, a fifth chamber in constant communication with the first chamber, a first bore in constant communication with the second chamber, and a second bore which is in constant communication with the wheel cylinder and which is to communicate with the first bore through a second passage means or with the first chamber through a third passage means; a first valve means for opening or closing the first passage means; a plunger movable in the second chamber and connected to the first valve means; a first piston movable in the third chamber, connected to the first plunger and larger in pressure, receiving area than the first plunger; the first plunger being acted upon by the braking fluid pressure when the first valve means is in a position to open the first passage means and the first piston being acted upon by the operating fluid pressure when the third chamber is in communication with the source of the operating fluid; the first plunger and the first piston being moved to cause the first valve means to open the first passage means when the operating fluid pressure acting upon the first piston is at a level which is higher than said first predetermined fixed level or which is lower than the first predetermined fixed level and higher than a first variable level which is predetermined in relation to a given braking fluid pressure; a second plunger movable in the first bore; a second piston movable in the fourth chamber and connected to the second plunger; the second piston being constantly acted upon the operating fluid pressure; a third plunger movable in the second bore; a third piston movable in the fifth chamber and connected to the third plunger; and a second valve means connected to the second plunger and movable in the second bore between a first position to open the second passage means and close the third passage means and a second position to close the second passage means and open the third passage means; the second and third plungers being movable between respective first positions to move the second valve means to said first position thereof and respective second positions thereof to move the second valve means to said second piston thereof; the second and third plungers being moved to the respective first positions thereof when the operating fluid pressure is at a level which is higher than a second variable level higher than said first variable level and predetermined in relation to said given braking fluid pressure and which is higher than said second predetermined fixed level and to the respective second positions thereof when the operating fluid pressure is at a level which is lower than said second variable level or than said second predetermined fixed level.

3. A skid control arrangement as set forth in claim 2, further comprising an electric control module responsive to an impending skid condition of a road wheel for producing an output signal when held operative; a two-way flow-shift valve unit having a fluid inlet port communicating with the source of the operating fluid, a first fluid outlet port communicating with the third chamber, and a second fluid outlet port open to the outside; the two-way flow-shift valve unit being held in a first position to open the first fluid outlet port in the absence of the outlet signal from the control module and a second position to open the second fluid outlet port in response to the output signal from the control module; a first switch responsive to the movement of said third plunger toward said second position thereof; and a second switch responsive to said second predetermined fixed level of the operating fluid pressure; the first and second switches being electrically connected in series to said control module for disabling the control module to produce the output signal when the first switch responds to said movement of the third plunger toward said second position thereof and/or the second switch responds to second predetermined fixed level of the operating fluid pressure.

4. A skid control arrangement as set forth in claim 2, in which said third passage means is provided by a first passageway interconnecting said first chamber and said second bore and a second passageway formed in said second plunger; leading from the first passageway and terminating at an end of the third plunger.

5. A skid control arrangement as set forth in claim 4, in which said second valve means is located between said second passage means and the open end of the third plunger for closing either of the second and third passage means as the same is moved by said second plunger.

6. A skid control arrangement as set forth in claim 2, in which said fifth chamber is in constant communication with said first chamber through a first passageway interconnecting the first chamber and the second bore and a second passageway formed in said third plunger and in said piston for providing communication between said first passageway and said fifth chamber.

7. A skid control arrangement as set forth in claim 2, in which said second and third pistons have substantially equal pressure working areas.

8. A skid control arrangement as set forth in claim 7, in which said second and third plungers have substantially equal pressure working areas.

9. A skid control arrangement as set forth in claim 2, further comprising biasing means operative to urge said second valve means to close said second passage means and to open said third passage means.

10. A skid control arrangement as set forth in claim 2, further comprising biasing means operative to urge said first valve means to close said first passage means.

11. A skid control arrangement as set forth in claim 2, further comprising biasing means operative to urge said third plunger to move toward said second position thereof.

12. A skid control arrangement as set forth in claim 2, in which said source of the operating fluid pressure is constituted essentially by a constant-displacement pump, an accumulator unit having a predetermined preload pressure and an unloading valve having a pilot port communicating with the pump and the accumulator unit, wherein said first predetermined fixed level is substantially equal to the cut-in pressure of said unloading valve and said second predetermined fixed level is the preload pressure of said accumulator unit.

13. In an automotive hydraulic braking system, means adapted to produce an electric skid indicating signal, a source of operating fluid pressure having a first predetermined fixed level and a second predetermined fixed level lower than the first predetermined fixed level, a master cylinder to produce the braking fluid pressure, a wheel cylinder to receive the braking fluid pressure produced at the master cylinder for applying a brake, a main braking fluid passageway connecting the master cylinder and wheel cylinder to feed the wheel cylinder with the braking fluid pressure produced at the master cylinder, a first piston-valve-arrangement disposed in the main braking fluid passageway and operable in response to the braking fluid pressure and the operating fluid pressure acting upon the respective ends thereof for blocking the passageway in response to the skid signal thereby reducing the braking fluid pressure to be supplied to the wheel cylinder a by-pass braking fluid passageway connecting the master cylinder and wheel cylinder in parallel with the main passageway, a second piston-valve-arrangement operable in response to the braking fluid pressure and the operating pressure acting upon the respective ends thereof for normally blocking the by-pass passageway and displaceable to open the same when the operating fluid pressure produced at the fluid pressure source drops respectively to a first predetermined level and a second predetermined level lower than said first predetermined level both indicating failure in the fluid pressure source for thereby feeding the braking fluid pressure produced at the master cylinder to the wheel cylinder, a first switch means disposed in the circuit of the skid signal producing means in series therewith and responsive to the displacement of the second piston-valve-arrangement when the operating fluid pressure drops to the first predetermined level for thereby opening said circuit of the skid signal producing means, and a second switch means disposed in the circuit of the skid signal producing means in series therewith and responsive to the operating fluid pressure when the operating fluid pressure drops to the second predetermined level for thereby opening said circuit of the skid signal producing means, wherein the arrangement is provided such that the first predetermined level of the operating fluid pressure is given in relation to a braking fluid pressure within a range lower than the first fixed level and higher than the second fixed level and sufficient to restore the first piston-valve-arrangement from the main passageway blocking position to its opening position, and the second predetermined level of the operating fluid pressure is given independently of the braking fluid pressure within a range higher than the second fixed level and lower than the first predetermined level.

14. In an automotive hydraulic braking system, means adapted to produce an electric skid signal; a source of the operating fluid pressure including a constant-displacement pump, an accumulator unit having a predetermined preload pressure and an unloading valve having a pilot port communicating with the pump and the accumulator unit, the unloading valve having a fixed cutin pressure higher than the preload pressure of the accumulator unit; a master cylinder to produce the braking fluid pressure; a wheel cylinder to receive the braking fluid pressure produced at the master cylinder for applying a brake; a main braking fluid passageway connecting the master cylinder and wheel cylinder to feed the wheel cylinder with the braking fluid pressure produced at the master cylinder; a first piston-valve-arrangement disposed in the main braking fluid passageway and operable in response to the braking fluid pressure and the operating fluid pressure acting upon the opposite ends thereof for blocking the main passageway in response to the skid signal thereby reducing the braking fluid pressure to be supplied to the wheel cylinder; a by-pass braking fluid passageway connecting the master cylinder and wheel cylinder in parallel with the main passageway; a second piston-valve-arrangement operable in response to the braking fluid pressure and the operating fluid pressure acting upon the respective ends thereof for normally blocking the by-pass passageway and displaceable to open the same when the operating fluid pressure produced at the fluid pressure source drops respectively to a first predetermined level indicating failure of the fluid pressure source which is given in relation to the braking fluid pressure with in a range higher than the preload pressure of the accumulator unit and lower than the cut-in pressure of the unloading valve and is sufficient to shift the first piston-valve-arrangement from the main passageway blocking position to its opening position, and to a second predetermined level indicating failure of the fluid pressure source which is given independently of the braking fluid pressure within a range higher than the preload pressure of the accumulator unit and lower than the first predetermined level; a first switch means disposed in the circuit of the skid signal producing means in series therewith and responsive to the displacement of the second piston-valve-arrangement when the operating fluid pressure drops to the first predetermined level for thereby opening said circuit of the skid signal producing means; and a second switch means in series therewith and responsive to the operating fluid pressure when the operating fluid pressure drops to the second predetermined level for thereby opening said circuit of the skid signal producing means.

* * * * *